A. HALLER.
VEHICLE WHEEL.
APPLICATION FILED OCT. 30, 1911.
1,050,128.
Patented Jan. 14, 1913.
2 SHEETS—SHEET 1.
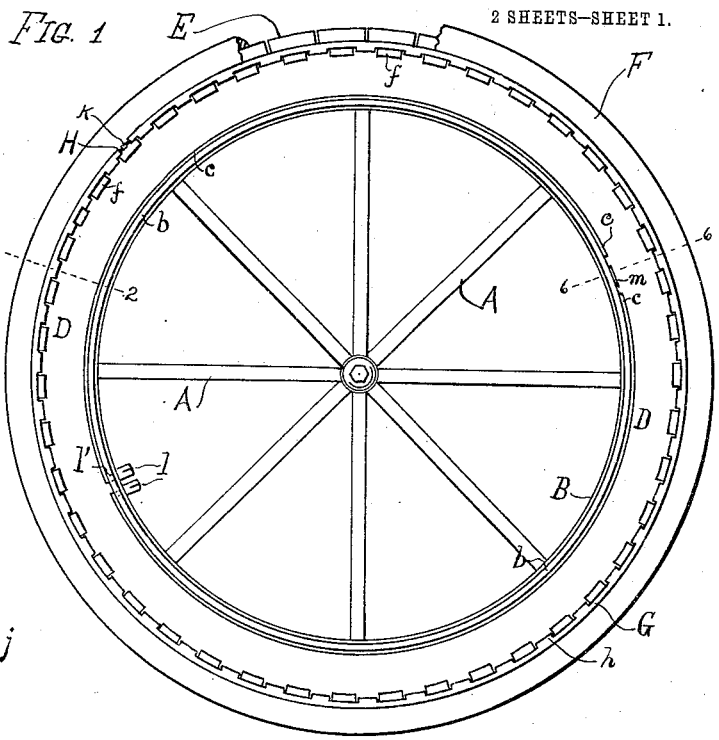
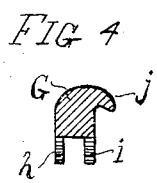
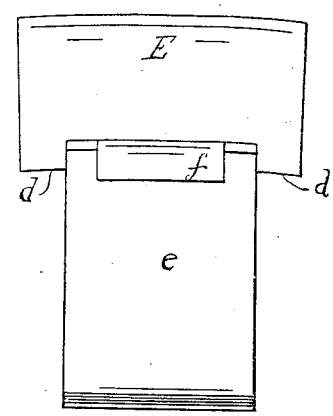
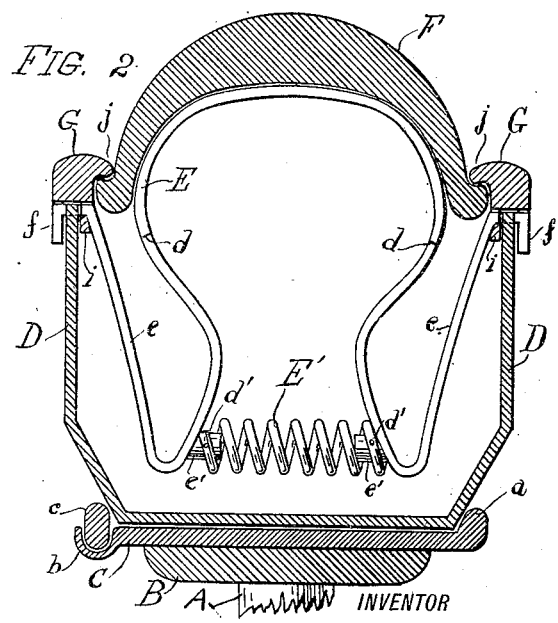
WITNESSES:
M. S. Crandall
F. A. Frogh
INVENTOR
A. HALLER
BY
H. C. Gardiner
ATTORNEY A. HALLER.
VEHICLE WHEEL.
APPLICATION FILED OCT. 30, 1911.
1,050,128.
Patented Jan. 14, 1913.
2 SHEETS—SHEET 2.
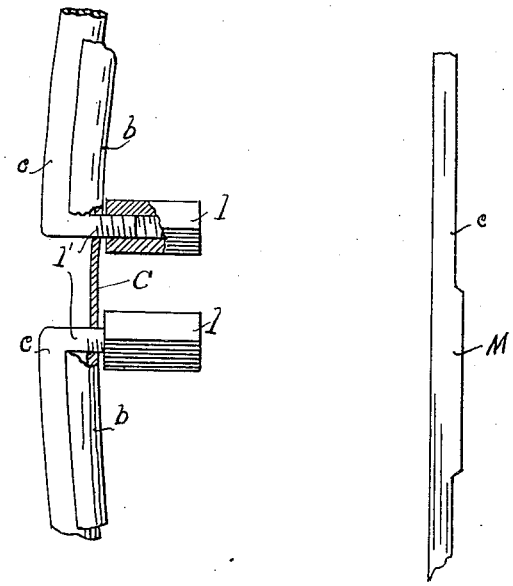
FIG. 8
FIG. 9
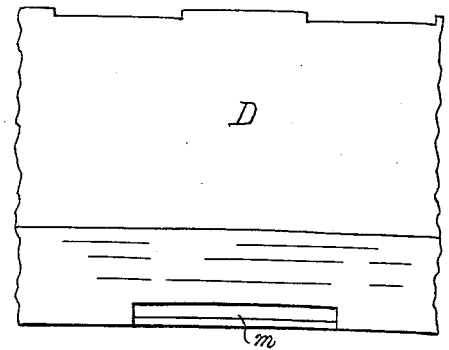
FIG. 7
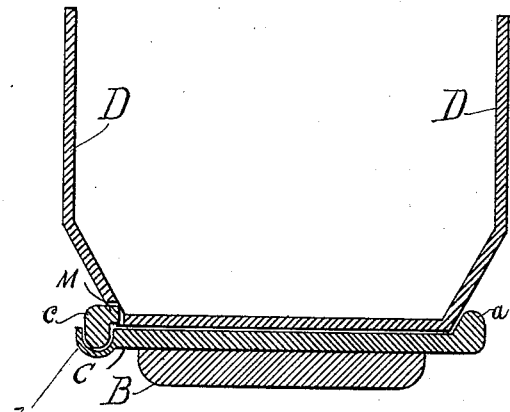
FIG. 6
WITNESSES:
M. S. Crandall
F. A. Frogh.
INVENTOR
A. HALLER
BY
H. E. Gardiner
ATTORNEY

UNITED STATES PATENT OFFICE.

ANTON HALLER, OF SIOUX CITY, IOWA.

VEHICLE-WHEEL.

1,050,128.  Specification of Letters Patent.  Patented Jan. 14, 1913.

Application filed October 30, 1911. Serial No. 657,489.

*To all whom it may concern:*

Be it known that I, ANTON HALLER, a citizen of the United States, and a resident of Sioux City, in the county of Woodbury and State of Iowa, have invented certain new and useful Improvements in Vehicle-Wheels, of which the following is a specification.

My invention relates to vehicle wheels and the object of the invention is the construction of a wheel suitable for automobiles and other heavy conveyances and furnishing the necessary resiliency without the use of pneumatic or inflated tires.

The invention consists of a series of spring sections suspended in the channel of the wheel and reinforced by a solid rubber tread, in the peculiar construction of the spring sections and tread, the means of securing the same to the wheel and in the arrangement and combination of parts, as will be hereinafter described and claimed.

I have illustrated my invention in the accompanying drawing, in which—

Figure 1 is a view of my newly invented wheel in side elevation, a part of the tread being broken away. Fig. 2 is a cross-section on line 2—2, Fig. 1, showing also a broken portion of the spoke. Fig. 3 is an enlarged detail showing a side elevation of the spring section. Fig. 4 is a cross-section of ring which holds the tread to its place on the wheel. Fig. 5 is an enlarged detail showing a part of the ring shown in Fig. 4 and means of fastening, a portion of the ring being broken away. Fig. 6 is a cross-section of felly, rim and channel, and also of the ring securing the channel in place, on line 6—6, Fig. 1. Fig. 7 is an enlarged broken portion of the channel in side elevation, the central line of the same being the same as line 6—6, Fig. 1. Fig. 8 is an enlarged detail of a portion of the channel ring and groove, showing the means of securing the ring in the groove. Fig. 9 is an enlarged detail of a broken portion of the channel ring in side elevation, the central part of which is on line 6—6, Fig. 1.

In the drawing A represents the spokes of the wheel, B the felly and C the rim, which are all of usual construction adapted to automobile wheels. The rim has the usual lug $a$ on the inner side and the groove $b$ for the insertion of the ring $c$ on the outside of the wheel to hold the channel in its place on the rim. The ends $1'$ of the ring are turned inwardly at right angles, Fig. 8, and threaded to receive the cap nuts 1. When the ring is put in place in the groove the nuts are tightened against the surface of the groove, securing the ring in place. On the inner edge of the ring, directly opposite the ring ends, is a lug M which projects into a groove $m$ in the corresponding part of the channel, Figs. 6, 7 and 9. The pressure of the lug in the groove against the channel holds the latter in its place on the rim and prevents slipping.

The channel D has straight sides extending somewhat beyond the rim, the lower corners being turned inwardly and the channel narrowed to conform to the rim. The outer edges of the channel are notched or cut out at regular intervals to receive the overturned edges $f$ of the spring sections E which are suspended in the channel. The sections are made of suitable steel or other resilient material and are shaped as shown in Fig. 2, the central or body portion being nearly circular in normal position, then turning outwardly and the side parts $e$ being upturned to meet the edges of the channel on which the parts $f$ are hooked or overlapped, fitting into the cut-out places in the edges of the channel.

The outer surfaces of the spring sections are curved to conform to the curvature of the wheel and the side parts $e$ are narrower than the body, forming shoulders $d$ on each edge. The hooks $f$ are also narrower than the side parts and form similar shoulders at each end of the hooks. The hooks $f$ are adapted to snugly fit the cut-out parts of the channel which are arranged at convenient intervals to leave small spaces between the body parts of the spring sections as seen in Fig. 1, and wider spaces between the side pieces $e$ of the sections. In the fork of each of the sections E are secured inwardly extending lugs $e'$ to which are secured the ends of a coil extension spring E′ by means of pins $d'$. As the tread of the wheel or pressure on the tire tends to spread the sides of the spring sections at this point, the coil springs reinforce them, holding them in normal position, and give them added strength and resiliency.

The rubber tire or tread F is solid and continuous, being curved laterally to conform to the spring sections and thicker in the middle, the edges being lobed-shaped and projecting outwardly, as seen in Fig. 2.

It is adjusted over the spring sections and secured thereon by rings G which have inwardly projecting lugs *j* adapted to fit over the outwardly projecting edges of the tread. The rings are adapted to cover the edges of the channel, inclosing the overturned parts of the spring sections, the forks *h* and *i* having rounded corners and being arranged at intervals on the rings to straddle the edges of the channel between the hooks or overturned parts. The inner forks *i* are narrower than the outer forks and fit in the spaces between the side pieces *e*, while the outer forks *h* being wider fit the larger spaces between the parts *f*. When the ends of the rings are secured together as presently described the spring sections and tread will be firmly held in place on the wheel. Any tendency of the tread to slip out of place when the sections are compressed is overcome by the peculiar shape of the tread, the lobe portions of which being much thicker than the part of the tread having contact with the projecting lugs of the retaining rings.

The ends of the rings are secured together in the following manner: In one end of the ring is freely secured a swivel I projected in the same direction as the ring and having an enlarged central part J with holes K for the insertion of a turning tool. At the opposite end of the enlarged part of the swivel is a threaded lug H adapted to fit an internally threaded opening L in the opposite end of the ring. When the ring is adjusted to the wheel it is drawn together by inserting the lug in the opening and turning the swivel with a tool until the desired tension is obtained.

As it is evident that the rings may be secured in different ways I do not limit myself to the exact method shown but wish to claim broadly a securing means suitable for the purposes described.

Having described my invention, what I claim as new and desire to secure by Letters Patent, is,—

1. A tire consisting of a channel secured to the rim of the wheel, spring sections centrally suspended in the channel having rounded body portions and upturned sides secured to the channel, a tread having lobed-shaped edges covering the spring sections, and rings having lugs projecting over the edges of the tread and forks straddling the edges of the channel between the sides of the spring sections for securing the tread and spring sections to the channel, substantially as specified.

2. A tire composed of a channel secured to the rim of the wheel and having cut-out portions in the edges thereof, spring sections having rounded central body portions and upturned side parts secured to the cut-out portions of the channel, a tread covering the spring sections having lobed-shaped, outwardly extending edges, and rings having lugs projecting over the edges of the tread and forks straddling the edges of the channel between the sides of the spring sections for securing the tread and spring sections to the channel, substantially as specified.

3. A tire composed of a channel secured to the rim of the wheel, spring sections centrally suspended in the channel having rounded body portions and upturned sides secured to the channel, springs connecting the side parts of each of the spring sections, a tread covering the spring sections and means for securing the tread and spring sections to the channel, substantially as specified.

4. The combination with the rim of a wheel, a channel secured to the rim and means for securing the channel to the rim, of spring sections E centrally suspended from the sides of the channel, a solid tread F covering the spring sections, and rings having lugs projecting over the edges of the tread and forks straddling the edges of the channel for securing the tread and spring sections to the channel, substantially as specified.

In testimony whereof I have hereunto affixed my signature in the presence of two subscribing witnesses.

ANTON HALLER.

Witnesses:
H. C. GARDINER,
A. D. COLLIER.

Copies of this patent may be obtained for five cents each, by addressing the "Commissioner of Patents, Washington, D. C."